United States Patent

[11] 3,630,685

[72] Inventors Herman Schildknecht
Wilcken Str. 5;
Klaus Maas, Zuincke Str. 44, both of Heidelberg, Germany
[21] Appl. No. 875,956
[22] Filed Nov. 12, 1969
[45] Patented Dec. 28, 1971
[32] Priorities Nov. 15, 1968
[33] Germany
[31] P 18 09 104.8;
Nov. 15, 1968, Germany, No. P 18 09 105.9

[54] METHOD FOR THE TRANSPORTATION OF CRYSTALS AND MELT
7 Claims, 1 Drawing Fig.

[52] U.S. Cl. ................................... 23/273 F
[51] Int. Cl. .................................... B01d 9/04
[50] Field of Search ........................... 23/273, 273 F, 270, 301; 62/58, 123, 354; 259/105, 108, 107; 18/12 SF

[56] References Cited
UNITED STATES PATENTS
| | | | | |
|---|---|---|---|---|
| 2,540,706 | 2/1951 | Fishill | | 259/107 |
| 3,433,598 | 3/1969 | Faaborg-Andersen | | 23/270 |
| 2,780,663 | 2/1957 | Gunness | | 23/273 F |
| 2,839,411 | 6/1958 | Vela | | 62/58 |
| 2,854,494 | 9/1958 | Thomas | | 62/58 |
| 2,920,347 | 1/1960 | Joukainen | | 18/12 SF |
| 3,101,598 | 8/1963 | Ross | | 62/354 |

FOREIGN PATENTS
| | | | | |
|---|---|---|---|---|
| 1,161,852 | 1/1964 | Germany | | 159/6 W |

Primary Examiner—Norman Yudkoff
Assistant Examiner—S. Silverberg
Attorneys—Ernest F. Marmorek, Jordan B. Bierman and Marmorek and Bierman ABSTRACT: Crystals and melt are transported in a crystallization column in countercurrent and in temperature gradient by a rotatable spiral having a plurality of turns. The spiral is disposed within an annular gap defined by the inner wall of the column and by a rod which is disposed within the column so that its axis is coincident with the column axis. The spiral extends substantially from the rod to substantially the inner wall of the column. The turns of the spiral run downwardly upon rotation of the spiral. The spiral has at its lower end one or more turns of opposite direction. The rod is rotatable about its longitudinal axis independent of the rotation of the spiral. This rotation is preferably in counterdirection to the direction of rotation of the spiral.

PATENTED DEC 28 1971
3,630,685
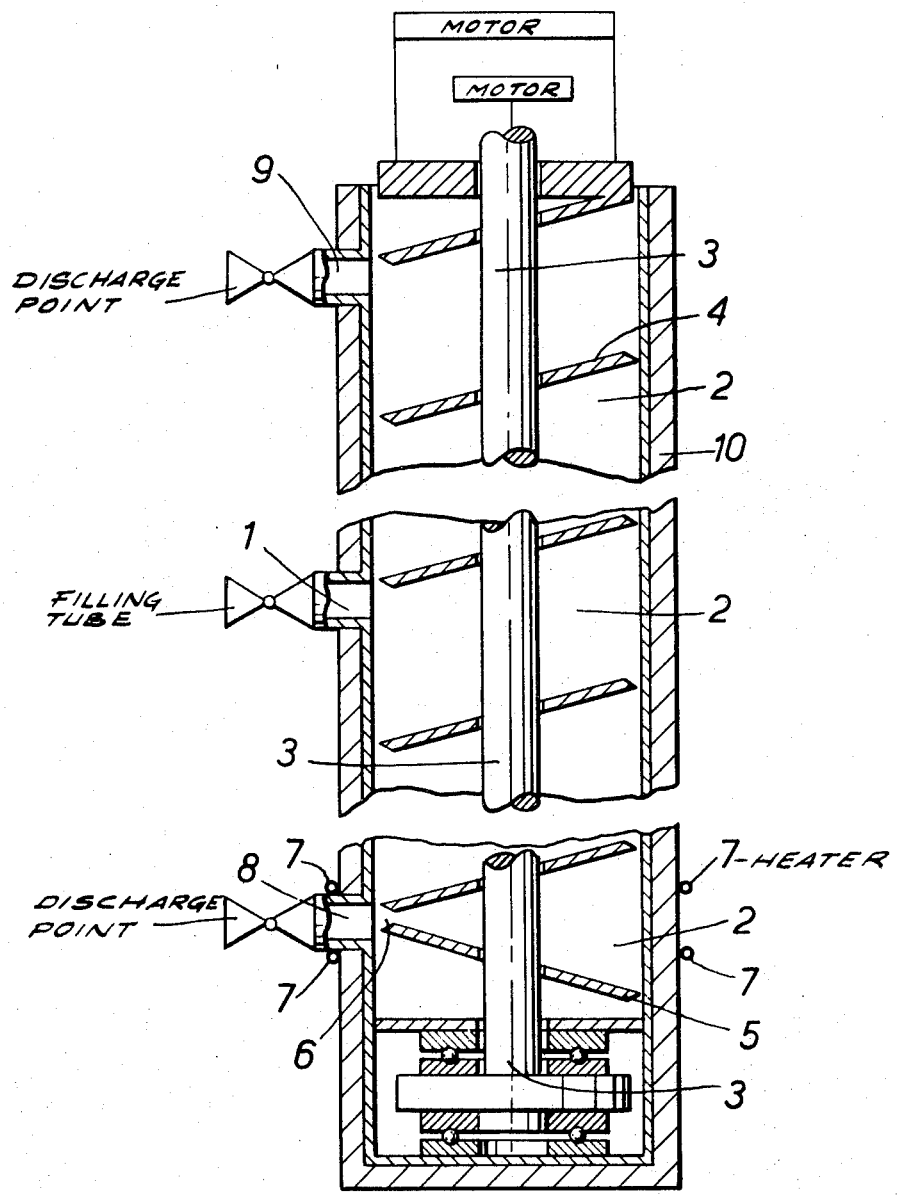
HERMANN SCHILDKNECHT
KLAUS MAAS
INVENTORS
BY
Marmorek & Bierman
ATTORNEYS

METHOD FOR THE TRANSPORTATION OF CRYSTALS AND MELT

The present invention relates to a method for transporting crystals and melt in a crystallization column in countercurrent and in temperature gradient. The invention further relates to a crystallization column suitable for carrying out this method.

The transportation of crystals and melt in a crystallization column in countercurrent and in temperature gradient by means of a spiral (helical spring) which rotates in and fills entirely an annular gap defined by the inner wall of the column and a fixed rod which is disposed within the column so that its axis is coincident with the column axis, the spiral rotating in such a way that the turns of the spiral run downward (i.e., toward the hotter part of the column), is known (H. Schildknecht and H. Vetter, "Angewandte Chemie: 73: 612-615 (1961)." According to this method, large quantities of a substance can be put through the column per unit time, and the continuous preparation of very pure substances is possible, even with mixed-crystal systems.

A new method has now been found which is much more efficient than the known method. In this new method, crystals and melt are transported in a crystallization column in countercurrent and in temperature gradient by means of a spiral which rotates in the annular gap defined by the inner wall of the column and a rod which is disposed within the column so that its axis is coincident with the column axis. The rotation of the spiral is such that the turns of the spiral run downward (i.e., toward the hotter part of the column). The spiral fills substantially the entire annular gap. This new method is characterized in that:

a. at its lower end (i.e., that end extending into the hot part of the annular gap) the spiral has one or more (preferably one to two) turns of opposite direction, which, therefore, upon rotation of the spiral, run upwardly, and b. the rod which is disposed within the column so that its axis is coincident with the column axis, is rotatable about its longitudinal axis.

The present invention further relates to a crystallization column suitable for carrying out the method of the present invention. This apparatus requires much less expenditure for control and servicing as compared with the known apparatus.

The new crystallization column, the spiral and the rod, which is disposed within the column so that its axis is coincident with the column axis, may, depending on temperature conditions and the type of crystal-melt systems to be separated, consist of ordinary materials. Refractory (heat-resistant) materials, such as special steel, e.g., V²A (Material No. 4541) or V⁴A (Material No. 4571) are, however, preferred.

The surfaces of the annular gap (that is, of the inner wall of the column and of the hollow or full rod, as defined) may be smooth or roughened, and may be provided with longitudinal or spiral grooves. Generally, they are smooth.

The rod which is disposed within the column so that its axis is coincident with the column axis preferably rotates about its longitudinal axis during the entire transportation process.

Advantageously, it rotates in opposite direction to the direction of rotation of the spiral. The rod may also be rotated back and forth alternately. By this rotation of the rod, one obtains the possibility of "running harder," that is, of using a denser crystal paste than would be possible with the use of an otherwise identical apparatus which, however, uses a fixed rod. This in turn permits an approximately three to six times greater throughput per unit time. ("Denser" crystal paste, as used herein, means a higher proportion of crystals in the crystal-melt system).

The preferred dimensional ratios of the crystallization column are as follows:

The ratio of the inside diameter of the column to its length is approximately 1:4 to 1:50, particularly 1:15 to 1:30.

The ratio of the outside diameter of the rod to the inside diameter of the column is in the order of about 1:2. It may, however, vary greatly depending on the size of the apparatus, the substance systems to be separated, and temperature conditions.

Although the pitch of a turn is advantageously equal to the difference between the inside radius of the column and the outside radius of the rod, it may also be double or one-half this value. The pitch of the counterturn is generally the same as that of the turns.

The speed of rotation of the spiral is adapted to the particular conditions encountered. It is especially dependent on the viscosity of the crystal-melt system and on the dimensions of the spiral (diameter, pitch). The speed of rotation of the spiral is usually about 10-150 revolutions per minute. If the rod which is disposed within the column so that its axis is coincident with the column axis also rotates, its speed of rotation is usually two to five times greater than the speed of rotation of the spiral.

The point of introduction for the raw material to be separated is advantageously located at approximately the middle of the column. The discharge point of the lower melting substance (or substance system) is advantageously located at the upper (i.e., coldest) end of the column.

Due to the novel counterturn(s) at the lower end of the spiral, the crystal paste is considerably densified at the level of the turn reversal in the annular gap. The residual melt adhering to the crystals is squeezed off the crystals. Thus there forms at the turn reversal a crystal plug which consists of crystals of the higher melting product. To tap this product, heat is supplied to partially melt the plug. A part of this melt is tapped. The rest of the melt passes back into the countercurrent. It is therefore obvious that the tapping point at the column is advisably disposed at the level of the turn reversal.

The hottest point of the column thus lies at the level of the turn reversal. From that point, the temperature decreases steadily, particularly toward the top part of the column. One produces this temperature gradient in the usual manner by adequate heating, cooling, and heat insulation.

It should be noted that it is possible to connect several such columns one behind the other in cascade operation.

The present invention will now be explained with reference to the following examples, as well as to the drawing, in which:

The FIGURE is a schematic view partly in section of a crystallization column which embodies the method of the present invention.

EXAMPLE 1

With reference to the drawing, 1,500 g. of molten crude caprolactam per hour are pressed through filling tube 1 of the crystallization column of the FIGURE into annular gap 2. The column has a useful length (annular gap) of about 90 cm. and an inside diameter of 8.2 cm. A fixed hollow rod 3 having an outside diameter of 3.6 cm. is disposed in the column so that its axis is coincident with the column axis. A spiral 4 having 28 turns (of which only five are shown), one counterturn 5, and a pitch of 3.0 cm. is disposed within annular gap 2. This spiral 4 is rotated at a speed of 30 revolutions per minute, in such a way that the 28 turns run downward, and the counterturn 5 runs upward, the crystals of caprolactam thereby being conveyed into these turn directions. A crystal plug forms at the turn reversal 6. The formed crystal plug is partially melted by means of a heating device 7. A part of this melt is tapped through the discharge point for the higher melting fraction 8. The rest of the melt again passes into the countercurrent. The column is insulated with an insulating layer 10.

The amount of material removed at the discharge point for the higher melting fraction 8 and at the discharge point for the lower melting fractions 9 is equal to the amount of crude product introduced into the column through filling tube 1.

The column operates automatically, without requiring checking or servicing. The yield of completely colorless pure caprolactam obtained is 80 percent based upon the crude product.

EXAMPLE 2

The spiral 4 rotates at 20 revolutions per minute. The rod 3 rotates in opposite direction to the spiral at 50 revolutions per minute, and the throughput of crude caprolactam is 5,000 g./hr. The other conditions are the same as in example 1. The same is true of the yield of pure caprolactam.

What is claimed is:

1. In a method for transporting crystals and melt in countercurrent flow to one another and through a temperature gradient between a cooler part and a hotter part in a crystallization column having a spiral which has a plurality of first turns running in a predetermined direction and one or more second turns located in the hotter part of the said column and running in a direction opposite to the direction of said first turns, a rod within the column having its axis coincident with the axis of said column, the steps comprising introducing raw material containing said crystals and melt into said column, rotating said spiral in a direction such that said first turns move the crystals of the raw material toward the hotter portion of the column and in which the said second turns advance the crystals and the residual melt adhering to the crystals toward the cooler portion to densify material in the region where said first and second turns are adjacent each other, and rotating said rod independently of the rotation of said spiral.

2. A method as described in claim 1 wherein the rotation of the rod is independent of the rotation of the spiral.

3. A method as described in claim 1 wherein the rotation of the rod is in counterdirection to the direction of rotation of the spiral.

4. A method as described in claim 1 wherein the direction of rotation of the rod is periodically alternated.

5. In a crystallization column wherein crystals and melt are transposed in countercurrent flow to one another and through a temperature gradient between a cooler part and a hotter part by a rotatable spiral having a plurality of turns, the improvement comprising one or more turns of said spiral at one end thereof having a pitch opposite in direction to the pitch of the remaining turns, and a rotatable rod disposed within the column so that its axis is coincident with the column axis, said rod being rotatable independently of said spiral, said spiral surrounding said rod and extending substantially from the rod to substantially the inner wall of the column.

6. A crystallization column as described in claim 5 wherein the rod rotates about its longitudinal axis in a direction counter to the direction of rotation of the spiral.

7. A crystallization column as described in claim 5 wherein the direction of rotation of the rod about its longitudinal axis is periodically alternated.

* * * * *